(12) United States Patent
Gupta et al.

(10) Patent No.: US 10,938,626 B2
(45) Date of Patent: Mar. 2, 2021

(54) FAST FAILOVER FOR GATEWAY INSTANCES

(71) Applicant: Microsoft Technology Licensing, LLC, Redmond, WA (US)

(72) Inventors: Nalin Raj Gupta, Bellevue, WA (US); Mohit Garg, Redmond, WA (US); Ashok Kumar Nandoori, Sammamish, WA (US); Ning Wei, Redmond, WA (US); Abhishek Agarwal, Redmond, WA (US); Vikrant Arora, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 16/235,025

(22) Filed: Dec. 28, 2018

(65) Prior Publication Data

US 2020/0036578 A1 Jan. 30, 2020

Related U.S. Application Data

(60) Provisional application No. 62/703,395, filed on Jul. 25, 2018.

(51) Int. Cl.
*H04L 12/24* (2006.01)
*H04L 12/26* (2006.01)
(Continued)

(52) U.S. Cl.
CPC .......... *H04L 41/0668* (2013.01); *H04L 12/66* (2013.01); *H04L 43/10* (2013.01);
(Continued)

(58) Field of Classification Search
CPC ..... H04L 41/0668; H04L 43/10; H04L 47/50; H04L 47/125; H04L 49/25; H04L 12/66;
(Continued)

(56) References Cited

U.S. PATENT DOCUMENTS

| 7,002,908 B1 * | 2/2006 | Lund ................... H04L 49/1553 370/228 |
| 7,609,618 B1 | 10/2009 | Biswas et al. |

(Continued)

FOREIGN PATENT DOCUMENTS

| EP | 1107511 A2 | 6/2001 |
| EP | 2375646 A1 | 10/2011 |

(Continued)

OTHER PUBLICATIONS

"Configuring Active-Active High Availability and Additional Passive Nodes with keepalived", Retrieved from: https://docs.nginx.com/nginx/admin-guide/high-availability/ha-keepalived-nodes/, Retrieved on Sep. 5, 2018, 13 Pages.

(Continued)

*Primary Examiner* — Nishant Divecha
(74) *Attorney, Agent, or Firm* — Newport IP, LLC; Han Gim

(57) ABSTRACT

Techniques are disclosed for managing gateway switchovers. An indication is received that a primary gateway will be switched to a backup gateway. In response to the indication, a response is made to a periodic health probe that a gateway switchover has been initiated. Incoming data traffic is forwarded from the primary gateway to the backup gateway. Subsequent to an elapsed time delay, a response is made to the periodic health probe that the primary gateway will no longer accept incoming data traffic. The time delay may be based at least in part on one or more of a time interval of the periodic poll and a time to effect the gateway switchover. The forwarding of the incoming data traffic from the primary gateway to the backup gateway is terminated.

14 Claims, 6 Drawing Sheets

(51) Int. Cl.
  *H04L 12/947* (2013.01)
  *H04L 12/803* (2013.01)
  *H04L 12/863* (2013.01)
  *H04L 12/66* (2006.01)

(52) U.S. Cl.
  CPC ............ *H04L 43/12* (2013.01); *H04L 47/125* (2013.01); *H04L 47/50* (2013.01); *H04L 49/25* (2013.01)

(58) Field of Classification Search
  CPC ..... H04L 43/12; H04L 41/0663; H04L 43/16; H04L 67/32; H04L 67/1031; H04L 67/1002
  See application file for complete search history.

(56) References Cited

U.S. PATENT DOCUMENTS

| | | |
|---|---|---|
| 7,743,155 B2 | 6/2010 | Pisharody et al. |
| 8,077,604 B1 | 12/2011 | Kanekar et al. |
| 8,756,455 B2 | 6/2014 | Ma |
| 8,914,521 B2 | 12/2014 | Leftik et al. |
| 9,462,305 B2 * | 10/2016 | Van Zijst .............. H04L 47/125 |
| 9,779,000 B2 | 10/2017 | Narang et al. |
| 10,051,002 B2 * | 8/2018 | Jain ..................... G06F 16/9024 |
| 10,326,838 B2 * | 6/2019 | Puri ..................... H04L 67/1095 |
| 2003/0088698 A1 * | 5/2003 | Singh .................. H04L 12/4641 709/239 |
| 2013/0016606 A1 | 1/2013 | Cirkovic et al. |
| 2018/0091591 A1 | 3/2018 | Puri et al. |

FOREIGN PATENT DOCUMENTS

| | | | | |
|---|---|---|---|---|
| EP | 2614628 A1 * | 7/2013 | ......... | H04L 67/1002 |
| EP | 2928134 A2 * | 10/2015 | ......... | H04L 12/4633 |

OTHER PUBLICATIONS

"Getting Started with AWS Direct Connect", Retrieved from: https://docs.aws.amazon.com/directconnect/latest/UserGuide/getting_started.html#RedundantConnections, Retrieved on Sep. 5, 2018, 14 Pages.

Wang, et al., "Highly Available Cross-Premises and VNet-to-VNet Connectivity", Retrieved from: https://docs.microsoft.com/en-us/azure/vpn-gateway/vpn-gateway-highlyavailable, Sep. 24, 2016, 4 Pages.

"International Search Report and Written Opinion Issued in PCT Application No. PCT/US19/037855", dated Sep. 4, 2019, 14 Pages.

* cited by examiner

FAST FAILOVER FOR GATEWAY INSTANCES

PRIORITY APPLICATION

This application claims the benefit of and priority to U.S. Provisional Application No. 62/703,395, filed Jul. 25, 2018, the entire contents of which are incorporated herein by reference.

BACKGROUND

A data center is a facility that houses computer systems and various networking, storage, and other related components. Data centers may, for example, provide computing services to businesses and individuals as a remote computing service or provide "software as a service" (e.g., cloud computing).

To facilitate efficient utilization of data center resources, virtualization technologies allow a physical computing device to host one or more virtual machines ("VM") that appear and operate as independent computer devices to a connected user. The data center can create, maintain or delete virtual machines in a dynamic manner.

A data center may implement one or more virtual network gateways to send/receive encrypted traffic between a virtual network and an on-premises location over a network such as the Internet. A virtual network gateway may comprise two or more virtual machines that are deployed to a gateway subnet. The virtual machines may be configured to contain routing tables and gateway services specific to the gateway. It is with respect to these considerations and others that the disclosure made herein is presented.

SUMMARY

In some embodiments, a virtual network gateway may be implemented as an active-passive VPN gateway which may comprise two instances in an active-standby configuration. One gateway instance may be an active instance, and the second gateway instance may be the backup or passive instance. The gateway may be implemented with a virtual IP (VIP) that users may configure for access to their virtual services. The VIP may be coupled to a load balancer to provide scalability and availability. The load balancer may be configured to distribute inbound flows that arrive on the load balancer's frontend to backend virtual resources and translate private IP addresses to public IP addresses and vice versa. The load balancer may be configured to load-balance incoming Internet traffic to the virtual machines in a virtual network. For example, incoming traffic that arrives at the frontend may be distributed to backend virtual resources.

To determine the health of the gateway instances, health probes may be used to poll the instances. When a probe fails to respond, or if the gateway instance indicates that it can no longer receive and process traffic, the load balancer may stop sending traffic to the gateway instance.

For planned maintenance or unplanned disruptions that are scheduled for the active gateway instance, the standby or backup gateway instance may take over (failover) automatically and assume responsibility for incoming traffic. However, in some cases the switchover may cause interruptions. For example, for planned maintenance, a delay may accrue, and if the standby gateway instance does not assume responsibility for incoming traffic before the primary gateway instance goes offline, then incoming traffic may be lost.

In response to a health probe from the load balancer, only one of the gateway instances responds, thus ensuring that traffic goes to only one gateway instance at a time and ensuring that connection tunnels gets connected to that gateway instance. If one of the gateway instances goes down, then the other gateway instance can take over and respond to the health probes from the load balancer. At this point, that gateway instance may attempt to reconnect tunnels as soon as possible so that user data traffic is uninterrupted.

In the described scenario, the time to reconnect tunnels during a planned maintenance switchover may be dependent on the health probe frequency of the load balancer, which may be in seconds. Thus, even if the tunnel reconnect operations are in milliseconds, the tunnel reconnection may still take seconds because of the health probe frequency, and thus introducing the possibility of dropping user data packets. When a scheduled switchover of a gateway instances occur, users may therefore lose data or incur significant delays in services to their downstream customers, which may result in lost revenue and customer dissatisfaction.

The disclosed embodiments describe technologies for forwarding incoming traffic when a switchover of a gateway instance is to occur. In some embodiments, incoming data may be queued while the switchover is in progress. In this way, the data center may switch gateway instances in a way that reduces the impact on users' continued use of their allocated virtual machines, while allowing data centers to adhere to operational objectives and at the same time improve operating efficiencies.

In one embodiment, tunnel reconnect times may be minimized by reducing the dependency on load balancer health probe time intervals during planned maintenance. Planned maintenance is a scenario that may account for instance downtimes. Tunnel reconnect times may be minimized by implementing packet forwarding from the gateway instance that is to be brought down to the backup gateway instance. This may be done as soon as the current tunnels are disconnected.

Loss of customer data packets may be minimized by queuing the data packets at the instance that will take over, and sending the packets to the customer's allocated resources once the new tunnels are connected. In the case where the source of the packets and the destination are both at the data center, and the tunnel connection is between virtual networks, then the data packets may be queued on both sides to prevent packet loss.

In one embodiment, the queue may be of fixed length and configured to replace old packets with newer packets. Additionally, the queue may implement a timeout for packets to avoid memory issues at the instance. In this way, where a tunnel reconnect may be implemented, the data packets may be queued and packet loss for traffic going out of a virtual network to the customer's on-premise network can be avoided.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
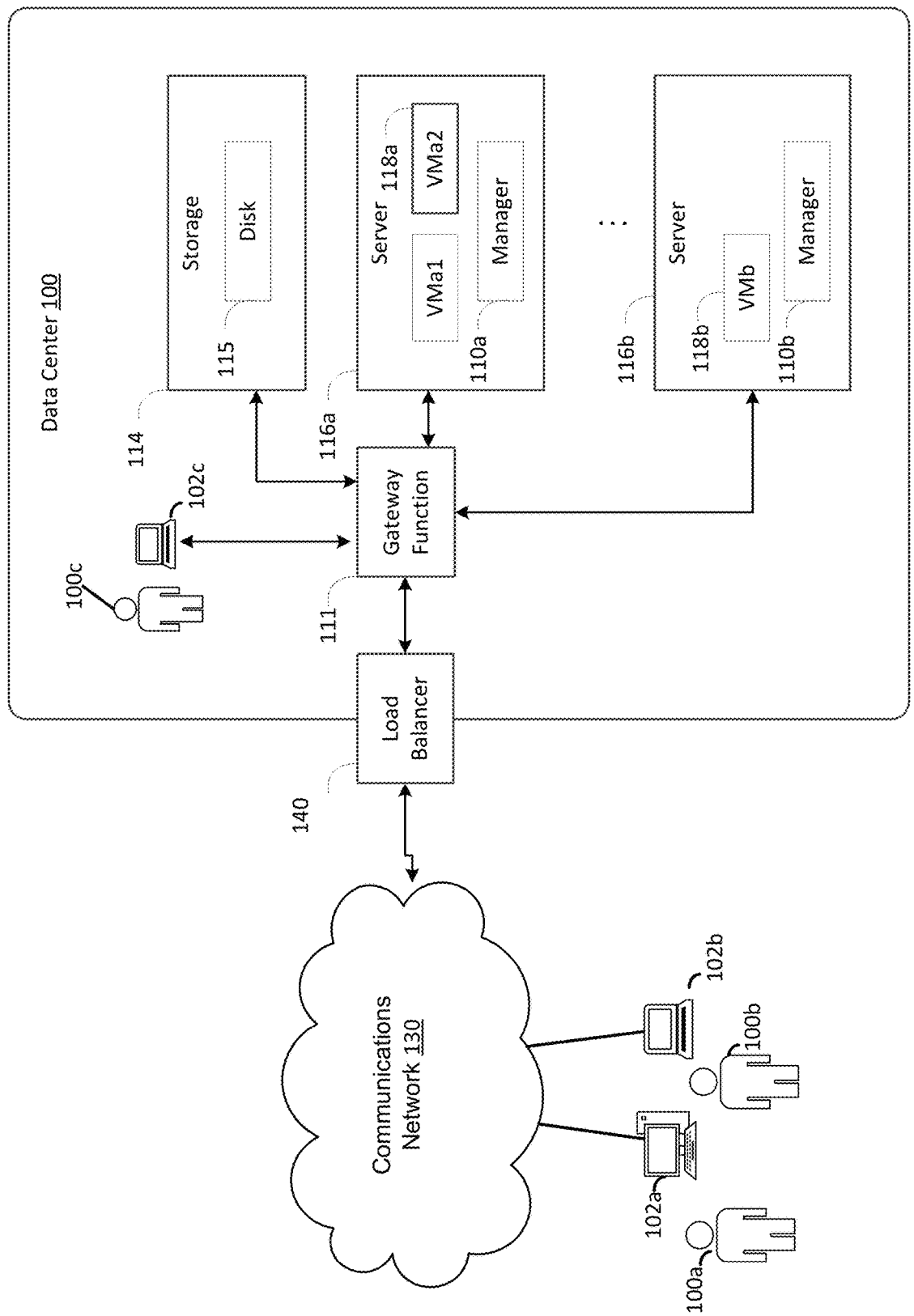
FIG. 1 is a diagram illustrating a data center for providing and allocating virtualized resources in accordance with the present disclosure.

The following Detailed Description describes technologies for switching gateway instances in a way that can reduce impact on a user's access to their virtual machines, while allowing data centers to adhere to operational objectives while reducing cost. In some embodiments, the described techniques may be implemented in response to any switchover or failover event.

In some embodiments, a virtual network gateway may be implemented as an active-passive VPN gateway which may comprise two instances in an active-standby configuration. One gateway instance may be an active instance, and the second gateway instance may be the backup or passive instance. The gateway may be implemented with a virtual IP (VIP) that users may configure for access to their virtual services. The VIP may be coupled to a load balancer to provide scalability and availability. The load balancer may be configured to distribute inbound flows that arrive on the load balancer's frontend to backend virtual resources and translate private IP addresses to public IP addresses and vice versa. The load balancer may be configured to load-balance incoming Internet traffic to the virtual machines in a virtual network. For example, incoming traffic that arrives at the frontend may be distributed to backend virtual resources.

To determine the health of the gateway instances, health probes may be used to poll the instances. When a probe fails to respond, or if the gateway instance indicates that it can no longer receive and process traffic, the load balancer may stop sending traffic to the gateway instance.

In some scenarios, the load balancer may poll the gateway instances with a health probe at a scheduled interval, for example every 5 seconds. When a scheduled switchover is to be implemented, the active gateway instance may receive a notification from a function or service at the data center. Other services and functions may also be informed of the switchover. In response to the next health probe, the active gateway instance may notify the load balancer that it cannot take new packets. However, depending on when the health probe is received, the active gateway instance may not be able to inform the load balancer that it cannot take new packets until nearly the end of the maximum polling interval. When the load balancer is notified, it may then inform the passive or backup gateway instance that it should accept new packets. However, depending on when the next health probe is sent, the passive gateway instance may not be informed by the load balancer that it should start accepting new packets until nearly the maximum polling interval. Thus in some combinations of the described scenarios, a dead zone may occur if the active gateway instance stops receiving data packets before the passive or backup gateway instance has assumed its role in accepting data packets.

In one embodiment, a forwarding mechanism may be implemented when the active gateway instance is notified that it will be brought down. Because of the potential delays due to polling intervals, and because the active gateway instance does not have control as to when it will be polled again, the active gateway instance may delay going offline until a fixed or predetermined time has elapsed after the forwarding mechanism is activated. In one embodiment, the active gateway instance may wait for three times the polling interval before it notifies the load balancer that it is offline. For example, if the polling interval is 5 seconds, then the active gateway instance may begin forwarding packets to the backup gateway instance and wait 15 seconds before it notifies the load balancer that it is offline. By implementing this switchover waiting period, the load balancer may be able to inform the backup gateway instance, at the next polling interval, that it should assume receiving incoming traffic, and provide sufficient time to establish connection tunnels in a way that avoids a dead zone in receiving incoming traffic.

It should be noted that the time delay before the active gateway instance notifies the load balancer that it is offline may be more or less than three times the polling interval, and may further be based on network and other conditions, and may be based on intervals other than the polling interval. For example, the time delay may be based on the expected time before the backup gateway instance is notified that it should become active, and the expected time that the backup gateway instance can establish connections and begin receiving incoming traffic.

While the present disclosure describes examples in the context of a switchover of gateway instances, the described techniques may be application in any scenario where machine switchovers are implemented and/or where stateful protocols are used.

FIG. 1 illustrates an example computing environment in which the embodiments described herein may be implemented. FIG. 1 illustrates a data center 100 that configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include storage resources 114 and servers 116a and 116b (which may be referred to herein singularly as "a server 116" or in the plural as "the servers 116") that provide computing resources available as disk 115 and virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Storage resources 114 and servers 116 may also execute functions that manage and control allocation of resources in the data center, such as a controller. The controller may be a fabric controller or another type of program configured to manage the allocation of virtual machines on storage resources 114 and servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Storage resources 114 and servers 116 may be configured to provide the computing resources described above. One or more of the servers 116 may be configured to execute a manager 110a or 110b (which may be referred herein singularly as "a manager 110" or in the plural as "the managers 110") configured to execute the virtual machines. The managers 110 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 100 shown in FIG. 1, a gateway 111 may be utilized to interconnect the servers 116a and 116b. Gateway 111 may also be connected to load balancer 140, which is connected to communications network 130. Gateway 111 may manage communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
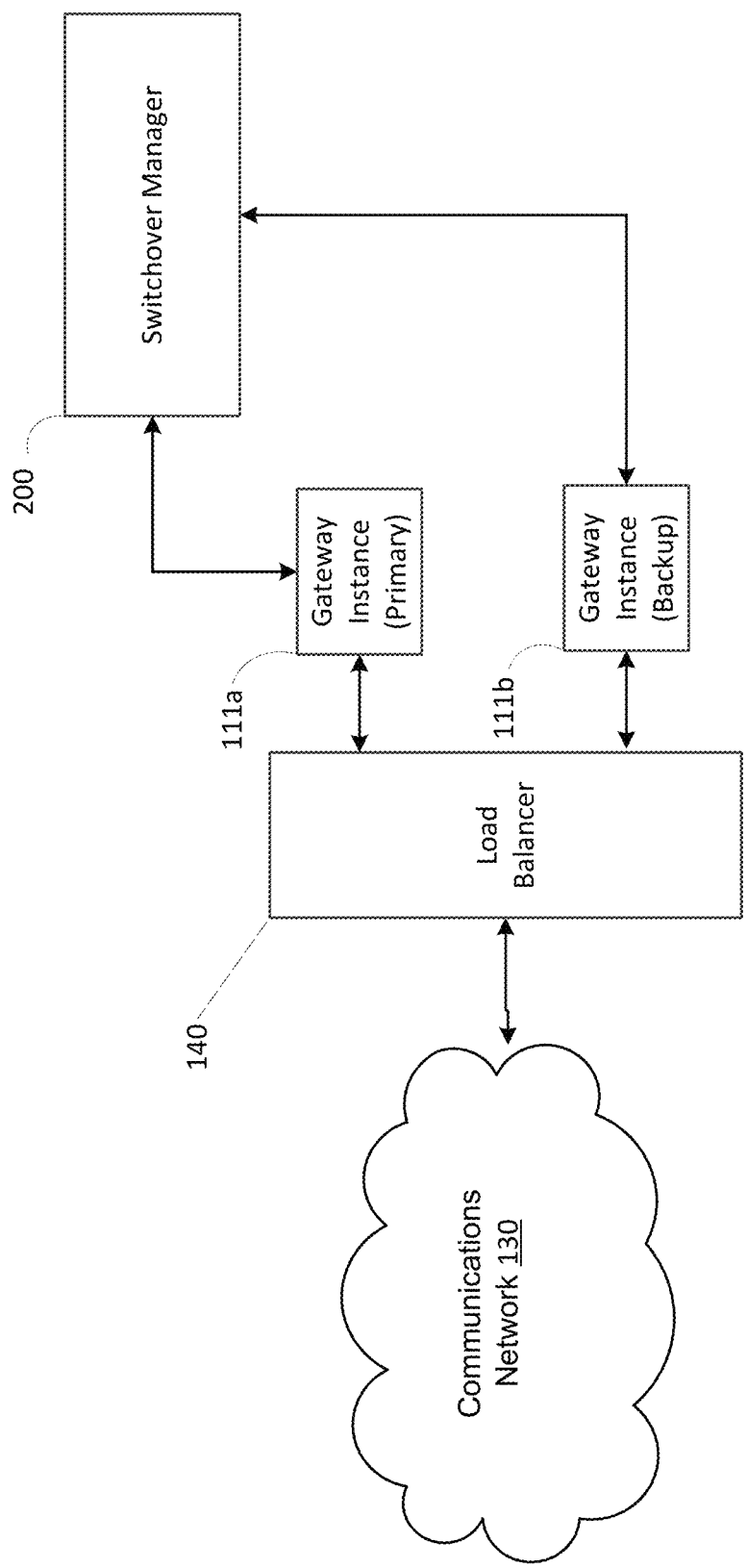
FIG. 2 is a diagram illustrating a load balancer and gateway instances in accordance with the present disclosure.

In one embodiment, the service provider providing services via data center 100 may implement a function that is configured to initiate a switchover of a gateway instance that is associated with maintenance of a virtual machine. In some embodiments, such a function may be referred to as a switchover manager. A switchover determination may be made based on one or more criteria. The criteria may include one or more of a required change in hardware configuration, a change in software configuration, or maintenance requirements for the currently hosting computing device. The criteria may also include operational requirements for the data center, such as collocating virtual machines for communication efficiency, improve security features, to improve load balancing, to retire aging hardware, and the like. For example, the switchover manager may determine if the virtual machine requires or would benefit from being hosted on a computing device with different or improved hardware or software features. The switchover manager may determine if a candidate host computing device is available that meets or exceeds the criteria for a machine that has such features. FIG. 2 illustrates a switchover manager 200 that communicates with primary gateway instance 111a and backup gateway instance 111b.

To illustrate an example implementation, it can be assumed that a VPN gateway may be implemented as two instances, Instance1 and Instance2, with a virtual IP Vip1, and an upgrade to this gateway is to be performed. Since this is a planned maintenance, the datacenter infrastructure may upgrade instances one by one and also notify instances before starting the upgrade to allow them to gracefully shutdown.

Figure 3:
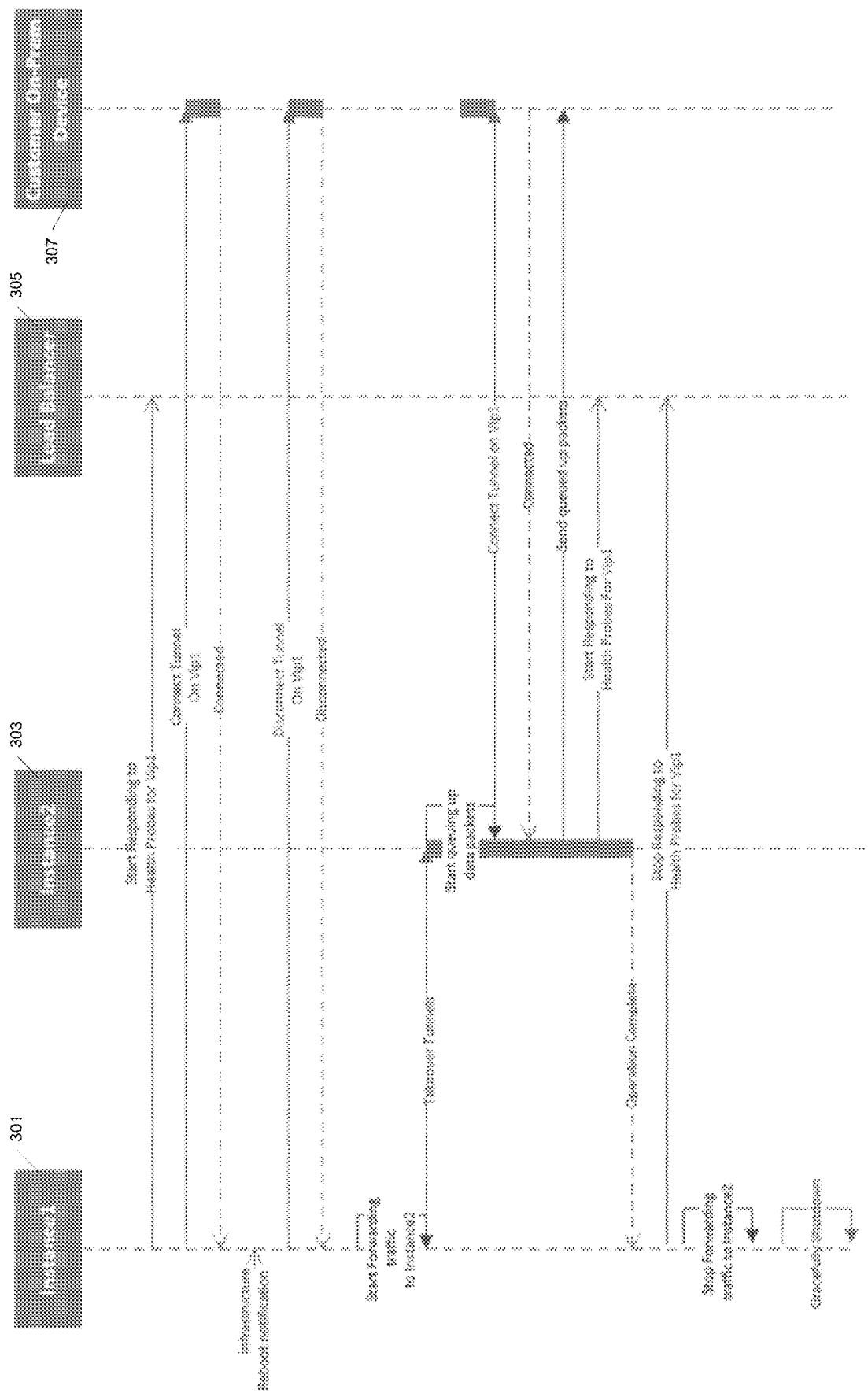
FIG. 3 is a diagram illustrating flows for instance switchover in accordance with the present disclosure.

FIG. 3 illustrates a flow sequence in accordance with an example implementation. When Instance1 (301) receives a notification that it is to be upgraded, Instance1 (301) may disconnect its established tunnels gracefully and notify Instance2 (303) to take over VIP1. Instance1 (301) may start forwarding any traffic to the endpoint at Instance2 (303). At this time, Instance1 (301) is still responding to the health probes from the load balancer 305.

Instance2 (303), upon receiving the notification that it should take over VIP1, starts queuing up data packets for the user, begins to connect tunnels, and responds to health probes from the load balancer 305. At this point, if load balancer 305 hasn't probed Instance2 (303) again and is still sending traffic to Instance1 (301), the traffic will be forwarded to Instance2 (303) and therefore the necessary tunnels will be connected. When tunnels are connected at Instance2 (303), Instance2 (303) may send queued packets to the customer's on-premise device (307). When the load balancer 305 probes Instance2 (303) again and Instance2 (303) responds positively that it is ready to take over, the load balancer 305 also starts sending traffic to Instance2 (303). Instance2 (303) then notifies Instance1 (301) to stop forwarding traffic to Instance1 (301). Instance1 (301) may then stop forwarding and gracefully shut down.

Figure 4:
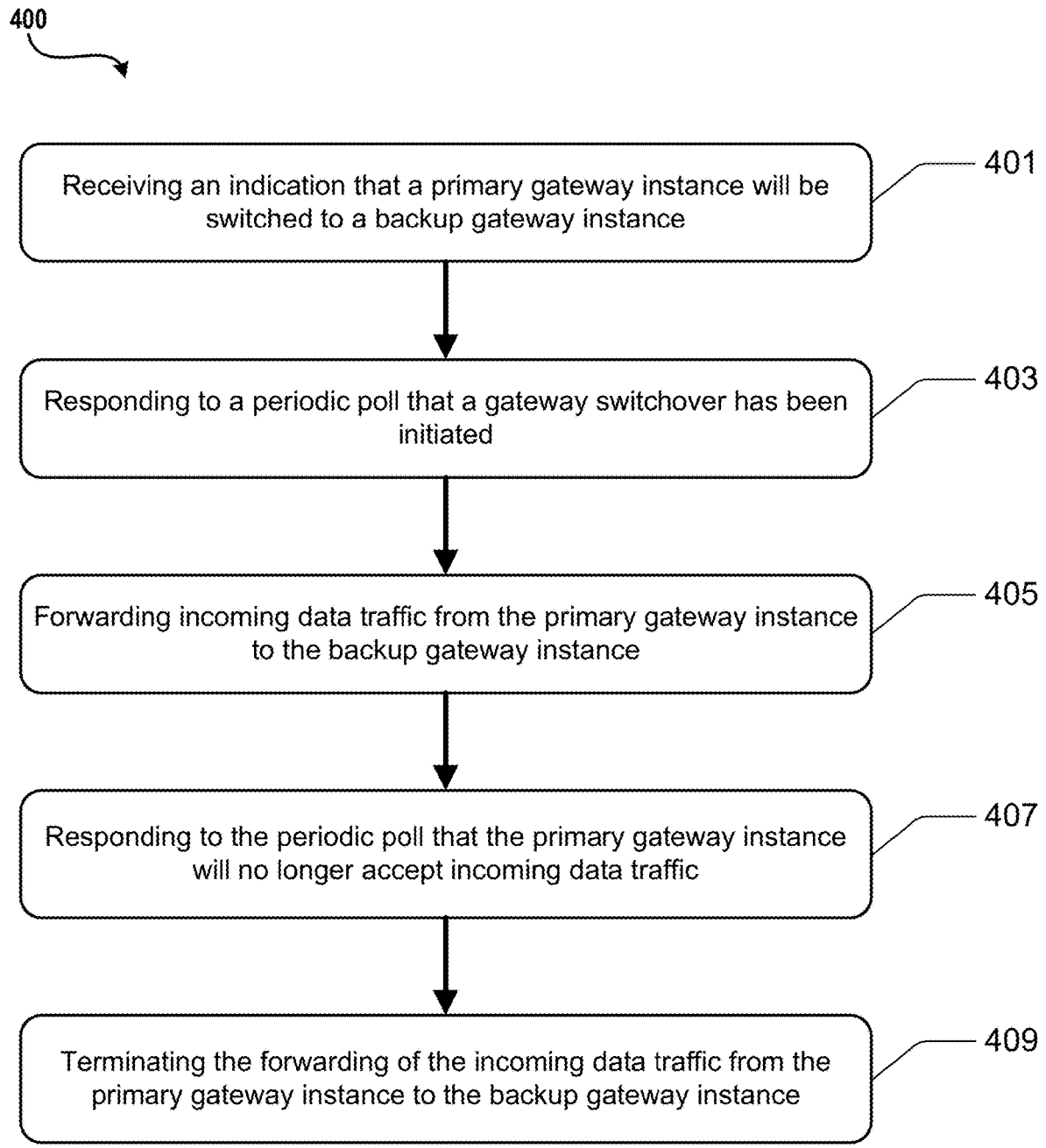
FIG. 4 is an example operational procedure in accordance with the present disclosure.

Turning now to FIG. 4, illustrated is an example operational procedure for handling a switchover in accordance with the present disclosure. In an embodiment, example operational procedure may implement a method for switching gateway instances executing on one or more computing devices. Referring to FIG. 4, operation 401 illustrates disconnecting existing virtual network tunnels on the primary virtual network gateway and establishing new virtual network tunnels on the backup virtual network gateway. In an embodiment, the disconnecting is performed in response to a notification that a primary virtual network gateway will be switched to a backup virtual network gateway.

Operation 401 may be followed by operation 403. Operation 403 illustrates continuing to respond, by the primary virtual network gateway, to health probes from the load balancer.

Operation 403 may be followed by operation 405. Operation 405 illustrates forwarding incoming data traffic from the primary virtual network gateway to the backup virtual network gateway.

Operation 405 may be followed by operation 407. Operation 407 illustrates responding, by the backup virtual network gateway, to health probes from the load balancer.

Operation 407 may be followed by operation 409. Operation 409 illustrates subsequent to an elapsed time delay, terminating responses to subsequent health probes by the primary virtual network gateway.

Operation 409 may be followed by operation 411. Operation 411 illustrates subsequent to an elapsed time delay, terminating responses to subsequent health probes by the primary virtual network gateway.

Figure 5:
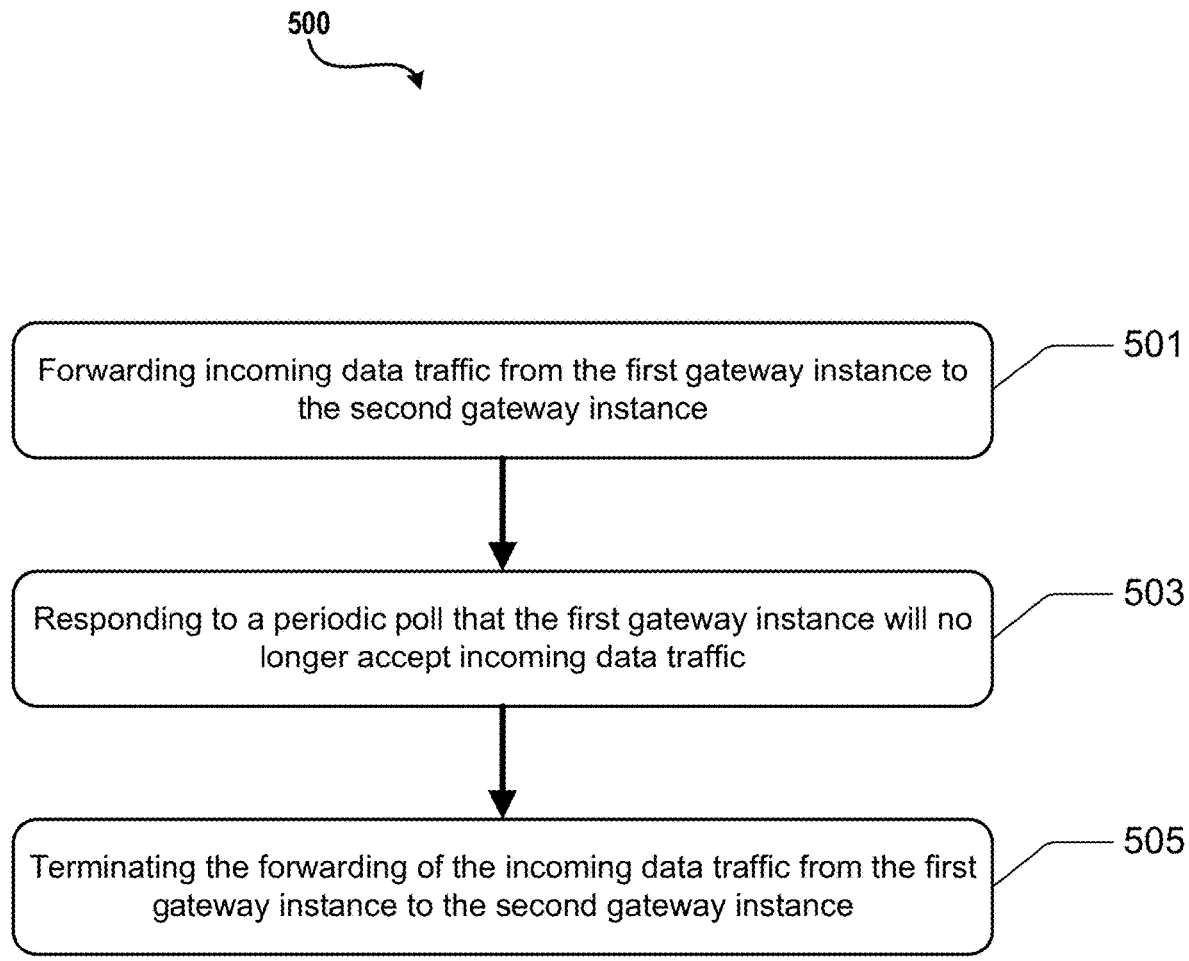
FIG. 5 is an example operational procedure in accordance with the present disclosure.

Turning now to FIG. 5, illustrated is an example operational procedure for handling a switchover in accordance with the present disclosure. In an embodiment, example operational procedure may implement a method for switching gateway instances executing on one or more computing devices. Referring to FIG. 5, operation 501 illustrates in response to an initiation of a switchover from a first virtual network gateway to a second virtual network gateway, forwarding incoming data traffic from the first virtual network gateway to the second virtual network gateway.

Operation 501 may be followed by operation 503. Operation 503 illustrates responding, by the first virtual network gateway and the second virtual network gateway, to health probes.

Operation 503 may be followed by operation 505. Operation 505 illustrates subsequent to an elapsed time delay, responding to subsequent health probes only by the backup virtual network gateway.

Operation 505 may be followed by operation 507. Operation 507 illustrates subsequent to an elapsed time delay, terminating the forwarding of the incoming data traffic from the first virtual network gateway to the second virtual network gateway.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 6:
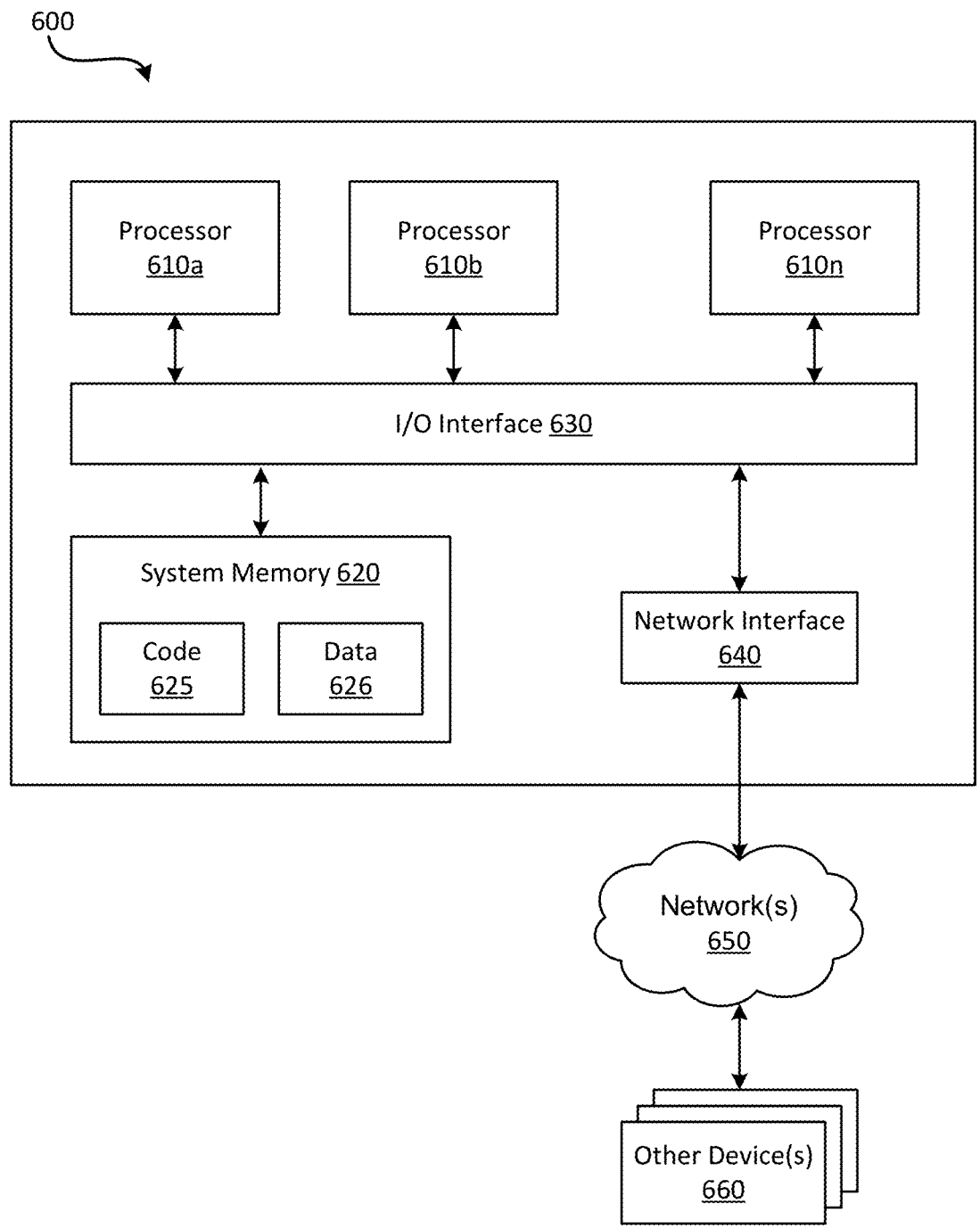
FIG. 6 is an example computing device in accordance with the present disclosure.

In some embodiments, a server that implements a portion or all of one or more of the technologies described herein, including the techniques to implement the switchover of gateway instances may include a general-purpose computer system that includes or is configured to access one or more computer-accessible media. FIG. 6 illustrates such a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 650, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein may be considered in view of the following clauses.

Example Clause A, a method for communicating data in a virtualized environment comprising virtual machines executing on one or more computing devices, the method comprising:
  in response to a notification that a primary virtual network gateway will be switched to a backup virtual network gateway, disconnecting existing virtual network tunnels on the primary virtual network gateway and establishing new virtual network tunnels on the backup virtual network gateway;
  continuing to respond, by the primary virtual network gateway, to health probes from the load balancer;
  forwarding incoming data traffic from the primary virtual network gateway to the backup virtual network gateway;
  responding, by the backup virtual network gateway, to health probes from the load balancer; and
  subsequent to an elapsed time delay:
  terminating responses to subsequent health probes by the primary virtual network gateway; and
  terminating the forwarding of the incoming data traffic from the primary virtual network gateway to the backup virtual network gateway;
  wherein the time delay is determined based at least in part on one or more of a polling interval of the health probe and a time to effect the virtual network gateway switchover.

Example Clause B, the method of Example Clause A, wherein the time delay is three times the polling interval of the health probe.

Example Clause C, the method of any one of Example Clauses A through B, wherein the primary virtual network gateway and the backup virtual network gateway are implemented with a virtual IP (VIP) address configured for access to the virtual network.

Example Clause D, the method of any one of Example Clauses A through C, wherein the primary virtual network gateway and the backup virtual network gateway are communicatively coupled to the load balancer, and the load balancer is configured to distribute inbound data to virtual resources of the virtual network and translate private IP addresses to public IP addresses.

Example Clause E, the method of any one of Example Clauses A through D, wherein when a virtual network gateway fails to respond to the health probe, the load balancer stops sending traffic to the virtual network gateway that failed to respond to the health probe.

Example Clause F, the method of any one of Example Clauses A through E, further comprising queuing incoming data while the gateway switchover is in progress.

Example Clause G, the method of any one of Example Clauses A through F, further comprising sending queued packets to destination resources subsequent to establishment of new connections using the backup virtual network gateway.

Example Clause H, the method of any one of Example Clauses A through G, wherein the queuing is implemented with a queue of fixed length and configured to replace older packets with newer packets.

Example Clause I, system, comprising:
one or more processors; and
a memory in communication with the one or more processors, the memory having computer-readable instructions stored thereupon that, when executed by the one or more processors, cause the system to perform operations comprising:
in response to an initiation of a switchover from a first virtual network gateway to a second virtual network gateway, forwarding incoming data traffic from the first virtual network gateway to the second virtual network gateway;
responding, by the first virtual network gateway and the second virtual network gateway, to health probes; and
subsequent to an elapsed time delay:
responding to subsequent health probes only by the backup virtual network gateway; and
terminating the forwarding of the incoming data traffic from the first virtual network gateway to the second virtual network gateway.

Example Clause J, the system of Example Clause I, wherein the time delay is a multiple of the time interval of the periodic poll.

Example Clause K, the system of any one of Example Clauses I through J, wherein the time delay is determined based at least in part on one or more of a polling interval of the health probe and a time to effect the virtual network gateway switchover.

Example Clause L, the system of any one of Example Clauses I through K, wherein:
the first virtual network gateway and the second virtual network gateway are communicatively coupled to a load balancer;
the load balancer is configured to distribute inbound data to virtual resources of the virtual network and translate private IP addresses to public IP addresses; and
when a virtual network gateway fails to respond to the health probe, the load balancer stops sending traffic to the virtual network gateway that failed to respond to the health probe.

Example Clause M, the system of any one of Example Clauses I through L, wherein the time delay is determined based on current network conditions.

Example Clause N, the system of any one of Example Clauses I through M, further comprising queuing incoming data while the gateway switchover is in progress.

Example Clause O, the system of any one of Example Clauses I through N, further comprising sending queued packets to destination resources subsequent to establishment of new connections using the second virtual network gateway.

Example Clause P, wherein when a source and destination of incoming packets are between virtual networks of a virtualized environment, queuing the packets at both the source and destination.

Example Clause Q, a computer-readable storage medium having computer-executable instructions stored thereupon which, when executed by one or more processors of a computing device, cause the computing device to perform operations comprising:
in response to an indication that an active virtual network gateway will be replaced with a backup virtual network gateway, indicating that the primary virtual network gateway will no longer accept incoming data traffic;
during a time threshold, forwarding incoming data traffic from the active virtual network gateway to the backup virtual network gateway, wherein the time threshold is based at least in part on one or more of a time interval of a periodic health probe and a time to effect the replacing of the active gateway; and
in response to completion of the time threshold:
terminating the forwarding of the incoming data traffic from the active virtual network gateway to the backup virtual network gateway; and
responding, by the backup virtual network gateway, to subsequent periodic health probes.

Example Clause R, the computer-readable storage medium of Example Clause Q, wherein the time threshold is three times a time interval of the periodic health probe.

Example Clause S, the computer-readable storage medium of any of Example Clauses Q through R, wherein the active virtual network gateway and the backup virtual network gateway are communicatively coupled to a load balancer configured to distribute inbound data and translate private IP addresses to public IP addresses.

Example Clause T, the computer-readable storage medium of any one of Example Clauses Q through S, wherein when a virtual network gateway fails to respond to the health probe, the load balancer stops sending traffic to the virtual network gateway that failed to respond to the health probe.

An example implementation may include:
A method for managing switchovers, the method comprising:
receiving a request to switch from a primary gateway instance to a backup gateway instance;
in response to the request, responding to a periodic poll that a switchover has been initiated;
forwarding incoming data traffic from the primary gateway instance to the backup gateway instance;
subsequent to an elapsed delay based at least in part on or more of the time period of the periodic poll and a time to establish the switchover, responding to the periodic poll that the primary gateway instance will no longer accept incoming data traffic; and
shutting down the primary gateway instance.

What is claimed is:
1. A method for communicating data in a virtualized environment where data traffic is distributed to a virtual network via virtual network gateways using a load balancer, the virtual network gateways configured to send and receive encrypted data between the virtual network and a device outside of the virtualized environment, the load balancer configured to distribute inbound flows to virtual resources in the virtual network via the virtual network gateways, the method comprising:
  in response to a notification that a primary virtual network gateway will be switched to a backup virtual network gateway:
    queuing, at the backup virtual network gateway, data packets for existing virtual network tunnels;
    disconnecting the existing virtual network tunnels on the primary virtual network gateway; and
    establishing new virtual network tunnels on the backup virtual network gateway, wherein the data packets are queued in a fixed length queue configured to replace older packets with newer packets based on a timeout;
  continuing to respond, by the primary virtual network gateway, to health probes from the load balancer;
  forwarding incoming data traffic from the primary virtual network gateway to the backup virtual network gateway;
  responding, by the backup virtual network gateway, to health probes from the load balancer;
  sending the queued data packets to resources associated with the existing virtual network tunnels; and
  subsequent to an elapsed time delay:
    terminating responses to subsequent health probes by the primary virtual network gateway; and
    terminating the forwarding of the incoming data traffic from the primary virtual network gateway to the backup virtual network gateway;
    wherein the time delay is determined based at least in part on one or more of a polling interval of the health probes and a time to effect a virtual network gateway switchover.

2. The method of claim 1, wherein the time delay is three times the polling interval of the health probe.

3. The method of claim 1, wherein the primary virtual network gateway and the backup virtual network gateway are implemented with a virtual IP (VIP) address configured for access to the virtual network.

4. The method of claim 1, wherein the primary virtual network gateway and the backup virtual network gateway are communicatively coupled to the load balancer, and the load balancer is configured to distribute inbound data to virtual resources of the virtual network and translate private IP addresses to public IP addresses.

5. The method of claim 4, wherein when a virtual network gateway fails to respond to the health probe, the load balancer stops sending traffic to the virtual network gateway that failed to respond to the health probe.

6. A system, comprising:
  one or more processors; and
  a memory in communication with the one or more processors, the memory having computer-readable instructions stored thereupon that, when executed by the one or more processors, cause the system to perform operations comprising:
    in response to an initiation of a switchover from a first virtual network gateway to a second virtual network gateway;
      disconnecting existing virtual network tunnels on the first virtual network gateway;
      queuing, at the second virtual network gateway, data packets for the existing virtual network tunnels; and
      establishing new virtual network tunnels on the second virtual network gateway, wherein the data packets are queued in a fixed length queue configured to replace older packets with newer packets based on a timeout;
    forwarding incoming data traffic from the first virtual network gateway to the second virtual network gateway, the first and second virtual network gateways configured to send and receive encrypted data between a virtual network and a device outside of the virtual network, and receive inbound flows distributed by a load balancer to virtual resources in the virtual network via the first and second virtual network gateways;
    continue responding, by the first virtual network gateway and the second virtual network gateway, to health probes from the load balancer;
    sending the queued data packets to on-premise devices; and
    subsequent to an elapsed time delay:
      responding to subsequent health probes only by the second virtual network gateway; and
      terminating the forwarding of the incoming data traffic from the first virtual network gateway to the second virtual network gateway;
      wherein the time delay is determined based at least in part on one or more of a polling interval of the health probes and a time to effect a virtual network gateway switchover.

7. The system of claim 6, wherein the time delay is a multiple of the time interval of the health probes.

8. The system of claim 6, wherein the time delay is determined based at least in part on one or more of a polling interval of the health probe and a time to effect a virtual network gateway switchover.

9. The system of claim 8, wherein: the first virtual network gateway and the second virtual network gateway are communicatively coupled to a load balancer; the load balancer is configured to distribute inbound data to virtual resources and translate private IP addresses to public IP addresses; and when a virtual network gateway fails to respond to the health probe, the load balancer stops sending traffic to the virtual network gateway that failed to respond to the health probe.

10. The system of claim 9, wherein the time delay is determined based on current network conditions.

11. A non-transitory computer-readable storage medium having computer-executable instructions stored thereupon which, when executed by one or more processors of a computing device, cause the computing device to perform operations comprising:
  in response to an indication that an active virtual network gateway will be replaced with a backup virtual network gateway,
    queuing, at the backup virtual network gateway, data packets for existing virtual network tunnels and indicating that the active virtual network gateway will no longer accept incoming data traffic, the active and backup virtual network gateways configured to send and receive encrypted data between a virtual network and a device outside of the virtual network, and receive inbound flows distributed by a load balancer to virtual resources in the virtual network via the active and backup virtual network gateways, wherein the data packets are queued in a fixed length queue configured to replace older packets with newer packets based on a timeout;

disconnecting the existing virtual network tunnels on the active virtual network gateways; and establishing new virtual network tunnels on the backup virtual network gateway;

continue responding, by the active virtual network gateway, to health probes from the load balancer;

during a time threshold, forwarding incoming data traffic from the active virtual network gateway to the backup virtual network gateway, wherein the time threshold is based at least in part on one or more of a time interval of a periodic health probe and a time to effect replacing of the active virtual network gateway;

responding, by the backup virtual network gateway, to health probes from the load balancer;

sending the queued data packets to on-premise devices; and in response to completion of the time threshold:

terminating the forwarding of the incoming data traffic from the active virtual network gateway to the backup virtual network gateway; and terminating responses to subsequent health probes by the active virtual network gateway;

wherein the time threshold is determined based at least in part on one or more of a polling interval of the health probes and a time to effect a virtual network gateway switchover.

12. The non-transitory computer-readable storage medium of claim 11, wherein the time threshold is three times a time interval of the periodic health probe.

13. The non-transitory computer-readable storage medium of claim 11, wherein the active virtual network gateway and the backup virtual network gateway are communicatively coupled to a load balancer configured to distribute inbound data and translate private IP addresses to public IP addresses.

14. The non-transitory computer-readable storage medium of claim 13, wherein when a virtual network gateway fails to respond to the health probe, the load balancer stops sending traffic to the virtual network gateway that failed to respond to the health probe.

* * * * *